United States Patent [19]

Takeda et al.

[11] 4,325,638

[45] Apr. 20, 1982

[54] ELECTRO-OPTICAL DISTANCE MEASURING APPARATUS

[75] Inventors: Harumi Takeda; Kiichi Furuya; Susumu Takahashi; Hiroshi Tamaki, all of Tokyo, Japan

[73] Assignee: Tokyo Kogaku Kikai Kabushiki Kaisha, Tokyo, Japan

[21] Appl. No.: 142,229

[22] Filed: Apr. 21, 1980

[30] Foreign Application Priority Data

Apr. 27, 1979 [JP] Japan ................... 54-52238

[51] Int. Cl.³ .................. G01B 11/14; G02B 5/17
[52] U.S. Cl. .................. 356/375; 250/227
[58] Field of Search ............. 356/4, 153, 73.1, 375; 350/96.21, 96.22, 96.18; 250/227, 201

[56] References Cited

U.S. PATENT DOCUMENTS

| | | | |
|---|---|---|---|
| 3,269,387 | 8/1966 | Wallace | 350/96.21 |
| 3,305,689 | 2/1967 | Leavy, Jr. et al. | 250/227 |
| 3,940,608 | 2/1976 | Cissinger et al. | 250/227 |
| 4,065,203 | 12/1977 | Goell et al. | 350/96.20 |
| 4,076,376 | 2/1978 | Slaughter | 350/96 |

FOREIGN PATENT DOCUMENTS 2711171 9/1977 Fed. Rep. of Germany.

OTHER PUBLICATIONS

Bedgood et al., "Demountable Connectors For Optical Fiber Systems", Electrical Comm. vol. 51, 1976, pp. 85-91.

*Primary Examiner*—William H. Punter
*Attorney, Agent, or Firm*—Brumbaugh, Graves, Donohue & Raymond

[57] ABSTRACT

Electro-optical distance measuring apparatus has a light emitting element for producing a modulated light which is projected through a condenser lens and an objective lens. Between the condenser and objective lenses, there is provided a light guide device which comprises a first optical fiber bundle adjacent to the objective lens and a second optical fiber bundle adjacent to the condenser lens. The first and second optical fiber bundles are in end-to-end relationship and the first bundle has a diameter smaller than that of the second bundle.

3 Claims, 3 Drawing Figures

ELECTRO-OPTICAL DISTANCE MEASURING APPARATUS

The present invention relates to distance measuring instruments and more particularly to electro-optical distance measuring instruments. More specifically, the present invention pertains to optical fiber means adopted in such distance measuring instruments between objective lens means and photoelectric elements.

In electro-optical distance measuring instruments, optical fiber in the form of a single filament or of a bundle are adopted between light emitting and light receiving elements and objective lens, so that the light from the light emitting element is directed through the objective lens to a target and the light as reflected at the target is led through the objective lens to the light receiving element. The optical fiber filament or bundle functions not only to guide the light along a predetermined path but also to provide a phase mixing effect for eliminating any adverse effect of phase difference which may exist between lights emitting from different parts on the light emitting surface of the element. Similar effect may also be provided at the light receiving element.

In this type of electro-optical distance measuring instrument, it is desirable from the viewpoint of manufacture and maintenance to provide the electrical system including the photoelectric elements separately from the optical system and assemble them together for ready detachment. It is further desirable that such detachment between the electrical and optical systems be made at the optical fibers. It should however be noted that in such a detachable structure it is very important to maintain the alignment between the optical fiber filament or bundle at the side of the photoelectric cell and that at the side of the objective lens so that the eccentricity between the optical fibers and therefore the possible loss of light at the junction between the optical fiber be minimized.

Various proposals have been made in the field of optical communication to provide junction between optical fibers with least possible misalignment. However, none of the known structures is satisfactory because they require precisely machined parts and structures are complicated. Further, in an electro-optical distance measuring instrument, the projected light bundle has an angle of divergence which is large in relation to that in an optical communication system, so that it is required in such an electro-optical distance measuring instrument to provide a precise control at the junction between the optical fibers not only in the eccentricity but also in the dimension along the optical axis. Therefore, it is practically difficult to directly apply the technique in the optical communication to the electro-optical distance measuring instrument.

It it therefore an object of the present invention to provide optical fiber means having junctions which are most suitable for electro-optical distance measuring instruments.

Another object of the present invention is to provide a junction between optical fibers in which a certain amount of misalignment can be permitted.

According to the present invention, the above and other objects can be accomplished by an electro-optical distance measuring apparatus comprising objective lens means and at least one photoelectric element, first optical fiber means and second optical fiber means between said objective lens means and said photoelectric element and being in end-to-end relationship at a junction area so that light is transmitted between said optical fiber means, said first optical fiber means being at a side of said objective lens means and having a diameter, at said junction area, which is smaller than that of said second optical fiber means which is at a side of said photoelectric element. The first and second optical fiber means may be in end-to-end abutting relationship at the junction area or lens or focusing mirror means may be provided between these fiber bundles. Each of the first and second optical fiber means may be comprised of a single filament of fiber or a bundle of fibers.

In an electro-optical distance measuring apparatus in which the light from the light emitting element is transmitted through an optical fiber filament or bundle so that the light emitting end of the fiber filament or bundle functions as a light source, the cross-sectional area of the optical fiber filament or bundle should be as small as possible from the viewpoint of accuracy of measurement, provided that the loss of light intensity is sufficiently small in the course of transmission through the fibers. It has been recognized in the electro-optical distance measuring apparatus that the intensity of the measuring light which has been projected through the objective lens and reflected at the target such as a corner cube is proportional to the intensity of the light source. With a more intense light source, it is possible to perform a measurement of a distance to a farther object. The area of the light source should in turn be as small as possible so as to decrease the internal reflection by structural members and lenses as compared with the income measuring light to thereby decrease the level of noise due to the internal reflection. It will therefore be understood that, with the optical fiber means at the side of the objective lens smaller in diameter than the optical fiber means at the side of the light emitting element, there will be no adverse effect on the function of the apparatus but there will rather be a preferable result in noise reduction. Further, it is possible to eliminate the problem of alignment at the junction of the optical fiber means which may otherwise be produced in assembling the apparatus.

Referring to the light receiving section, it should be noted that the light bundle reflected at the corner cube has a sufficiently small angle of divergence so that there will be no noticeable loss of measuring light even with the light receiving optical fiber means of a small diameter. Further, the light receiving fiber means of such a decreased diameter provides additional advantages in respect of measuring accuracy in that it provides a restriction of the possible incidence of noise producing lights into the fiber means, and that the apparatus becomes less sensitive to a change in the intensity of incident light due to a change in the distance to be measured. The larger diameter of the fiber means at the photoelectric element side is further considered advantageous in respect of the phase mixing effect.

The above and other objects and features of the present invention will become apparent from the following descriptions of preferred embodiments taking reference to the accompanying drawings, in which.

Figure 1:
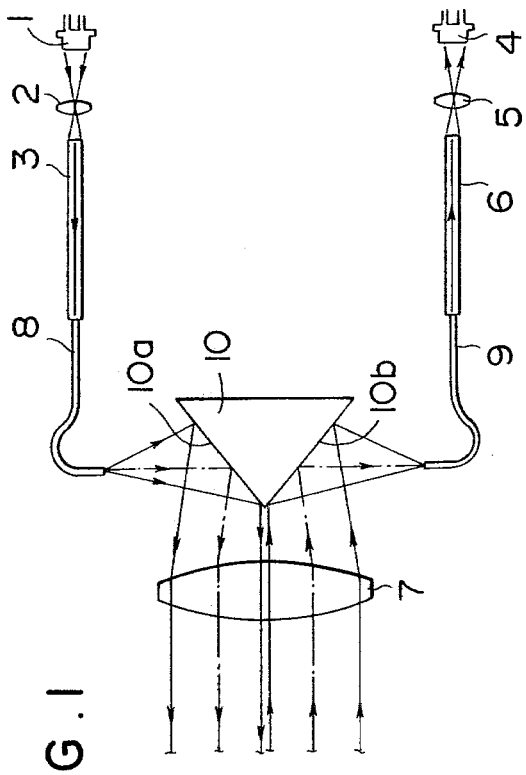
FIG. 1 is a diagrammatical illustration of the optical system of an electro-optical distance measuring apparatus in accordance with one embodiment of the present invention.

Referring now to the drawings, particularly to FIG. 1, the electro-optical distance measuring apparatus which includes a light emitting element 1 assembled as a unit with a condenser lens 2 and an optical fiber 3. The light from the element 1 is gathered by the lens 2 and introduced into the optical fiber 3. The apparatus further includes a light receiving element 4, a condenser lens 5 and an optical fiber bundle 6 which are arranged in such a manner that the light through the fiber 6 is directed through the lens 5 to the element 4. The apparatus further includes an objective lens assembly which is comprised of an objective lens 7, optical fibers 8 and 9 and a light splitting reflector 10. The optical fibers 8 and 9 cooperate with the optical fibers 3 and 6, respectively, with their one ends in abutting relationship with the adjacent ends of the fibers 3 and 6.

The reflector 10 has reflecting surfaces 10a and 10b which are inclined with respect to the optical axis of the objective lens 7. The optical fiber 8 has the other end opposed to the reflecting surface 10a of the reflector 10 so that the modulated light from the element 1 is led through the lens 2 and optical fibers 3 and 8 to the reflecting surface 10a to be reflected toward the objective lens 7. The light is thus projected through the objective lens 7 to an object which is in the form of a corner cube 11 for reflecting the light from the objective lens 7 toward the lens 7.

The optical fiber 9 is opposed at the end remote from the fiber 6 to the reflecting surface 10b so that the measuring light which has been reflected at the corner cube 11 and passed through the objective lens 7 is reflected at the surface 10b toward said end of the optical fiber 9 to be directed through the optical fiber 9 and 6 and the lens 5 to the light receiving element 4. According to the feature of the present invention, in order for ready alignment of the abutted pair of the optical fibers, the lens side fiber bundles 8 and 9 have diameters which are smaller than the diameters of the other optical fiber bundles 3 and 6.

Figure 2:
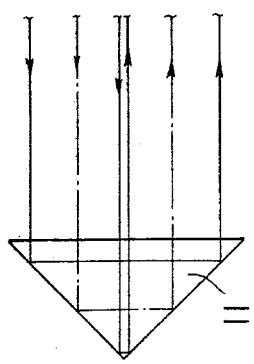
FIG. 2 is a sectional view showing an example of the junction between abutted optical fiber bundles; and, FIG. 3 is a fragmentary view showing another embodiment.

In FIG. 2, there is shown an example of the junction between the optical fibers 3 and 8. The objective lens assembly has a casing 12 which has a guide block 13 mounted thereon. The block 13 is formed with a bore 14 extending along the optical path for receiving a slidable fitting 15 which is fitted to the optical fiber 8 at the end adjacent to the optical fiber 3. A spring 17 is disposed between the casing 12 and the fitting 15 to force the fitting 15 toward the block 13. The element side optical fiber 3 is attached with a fitting 18 which is also fitted to the bore 14 and secured to the block 13 by means of screws 19. In this manner, the optical fibers 3 and 8 are maintained in an end-to-end abutting relationship. It should be understood that the junction between the optical fibers 6 and 9 is constructed in the same manner.

Figure 3:
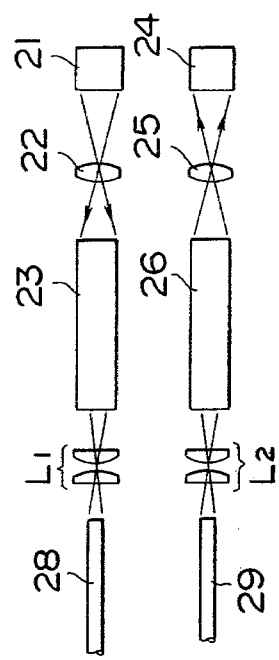

Referring now to FIG. 3 which shows another embodiment of the present invention and in which corresponding parts are designated by the same reference numerals as in FIG. 1 with an addition of number twenty. The apparatus includes a light emitting section having a light emitting diode 21, a condenser lens 22 and an element side optical fiber 23. There is also a light receiving section having a light receiving element 24, a condenser lens 25 and an element side optical fiber 26.

The apparatus further includes an objective lens assembly having lens side optical fibers 28 and 29 respectively opposed to the optical fibers 23 and 26. It will be noted that the optical fibers 28 and 29 are small in diameter than the optical fibers 23 and 26. Between the optical fibers 23 and 28, there is disposed a focusing lens $L_1$ so that the light from the optical fiber 23 is focused at the adjacent end surface of the optical fiber 28. Similarly, a focusing lens $L_2$ is disposed between the optical fiber 26 and 29 so that the light from the optical fiber 29 is focused at the adjacent end surface of the optical fiber 26.

It should of course be noted that the focusing lenses $L_1$ and $L_2$ may be substituted by any other focusing optical elements such as reflectors.

The invention has thus been shown and described with reference to specific embodiments, however, it should be noted that the invention is in no way limited to the details of the illustrated structures but changes and modifications may be made without departing from the scope of the appended claims.

We claim:

1. A distance measuring apparatus comprising objective lens means having a focal point and at least one photoelectric light-emitting element, optical fiber means between said objective lens means and said photoelectric element and comprising at least one first optical fiber having one end arranged to receive a light beam from said light-emitting element and at least one second optical fiber having one end which is an end abutting relationship with the other end of the first optical fiber so that light is transmitted between said first and second optical fibers, said first optical fiber being at said other end larger in area than said one end of the second optical fiber so that the light beam transmitted through the first optical fiber is partially prevented from entering the second optical fiber, the other end of said second optical fiber being at said focal point of the objective lens means so that the light beam which has passed through the second optical fiber and the objective lens means is emitted in the form of a parallel light beam, light receiving means arranged to receive the light beam which has been projected from the objective lens means and reflected by a reflector located at a measuring point.

2. Apparatus in accordance with claim 1 in which one of said optical fibers is attached with a slidable fitting which is slidably received in a bore of a guide block, the other fibers being also attached with a fitting which is also received in the bore of the guide block so that the both optical fibers are in end abutting relationship.

3. Apparatus in accordance with claim 1 in which said light receiving means includes a photoelectric light receiving element, at least one third optical fiber having one end located at said focal point of the objective lens means so as to receive the light beam which has been reflected by the reflector and passed through the objective lens means, at least one fourth optical fiber having one end which is in end-to-end relationship with the other end of the third optical fiber so that light is transmitted between said third and fourth optical fibers, the other end of said fourth optical fiber being opposed to said light receiving element, said other end of the third optical fiber being smaller in area than said one end of the fourth optical element.

* * * * *